United States Patent Office 3,353,284
Patented Nov. 21, 1967

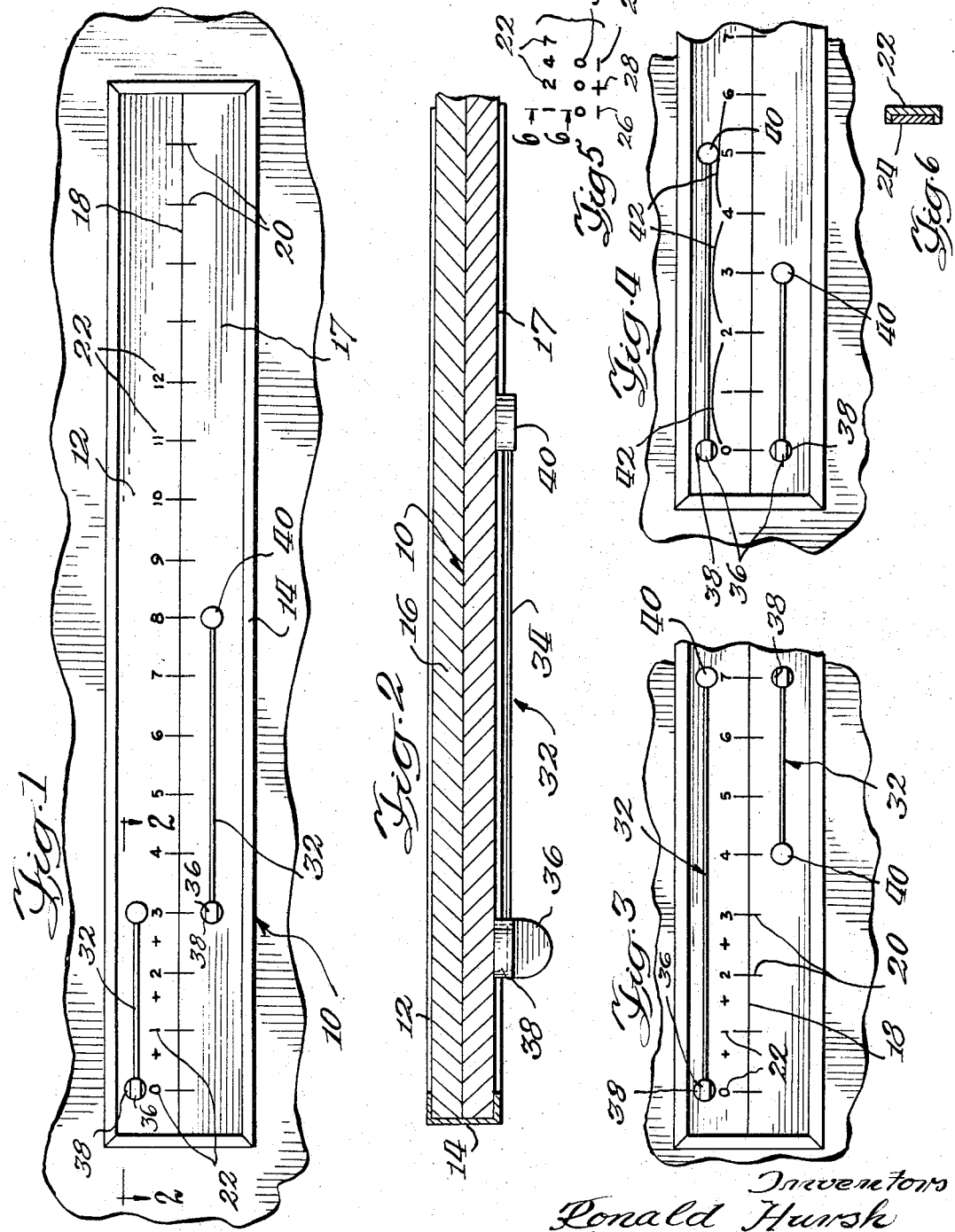

3,353,284
MAGNETIC NUMBER LINE BOARD
Ronald Hursh, La Grange Park, and Rudolf Ringhofer, Flossmoor, Ill., assignors to La Pine Scientific Company, a corporation of Illinois
Filed July 16, 1965, Ser. No. 472,563
1 Claim. (Cl. 35—31)

ABSTRACT OF THE DISCLOSURE

A number line board of magnetizable material having a horizontal line on the surface with short vertical lines at spaced intervals. Numerals are magnetically mounted at desired intervals along the horizontal line. An elongated flexible tape is coiled on a reel which in turn has a magnet thereon for mounting on the board. A disc with another magnet thereon is secured to the end of the tape, and the tape is removably secured to the surface of the board, extending between selected members.

---

This invention relates to a teaching aid and more particularly to a magnetic number line board for teaching mathematics and the like.

In recent years a new system for teaching mathematics in the schools has been developed and has become more and more widely adopted. The concepts of the new mathematics have been extended all the way down to the kindergarten level in some areas with the result that phenomenal things have been achieved in teaching children complex mathematics at an early age. One of the basic tools of the new mathematics is the so-called "number line" which heretofore has been drawn on a blackboard with the numbers such as either 0 to 9 or minus 9 to 10 to plus 9 lettered in over equal divisions of the number line. It is known that boards with the line and numbers painted thereon have likewise been used.

Many disadvantages exist with the prior uses of number lines. In the case of the chalk on the blackboard the numbers get erased, the line gets erased, in using the line the demonstration lines get intertwined and the presence of all the numbers causes confusion in the student. The painted board is relatively inflexible in use in that the numbers are all painted on and cannot be changed or removed without considerable trouble and delay.

It is therefore a principal object of our invention to overcome the above noted disadvantages of the prior art and to provide an improved number line board for use as a teaching aid.

It is another object of our invention to provide an improved number line board that provides an improved method for teaching mathematics.

Another object of our invention is to provide an improved number line board having removable and replaceable numbers.

Still another object of our invention is to provide an improved number line board having extendable marking means removable and replaceable on said board.

And another object of our invention is to provide an improved number line board having a surface which is receptive to chalk or other removable markings.

A further object of our invention is to provide an improved number line board that is highly versatile and adaptable in use.

And a further object of our invention is to provide an improved device that can be used to teach other subjects besides mathematics without changing the basic construction of the device.

Still a further object of this invention is to provide an improved number line board that is unique in construction, practical in use and substantially maintenance free.

These and other objects and advantages of this invention will more fully appear from the following description of the preferred embodiment of the invention shown in the accompanying drawing, in which:

FIGURE 1 is an elevational view of the improved number line board showing our invention;

FIGURE 2 is an enlarged cross sectional view taken along the line 2—2 of FIGURE 1;

FIGURE 3 is a partial elevational view of the number line board illustrating the solution of a problem;

FIGURE 4 is a partial elevational view of the number line board illustrating still another solution of a problem;

FIGURE 5 is a collection of the loose parts that are to be used with our invention; and FIGURE 6 is a cross sectional view taken on the line 6—6 of one of the parts of FIG. 5.

Heretofore, in teaching the new mathematics, a divided number line was drawn on a blackboard and numbers written thereon. Each time a problem was to be changed or a different concept taught, the whole or part of the line had to be erased and redone. Another prior method made use of a painted line on a board with numbers painted at each division of the line. This was relatively inflexible and unchanging, limiting the scope of the board as a teaching aid. In addition, particularly in teaching young children the use of more numbers than are needed or than are being used results in distracting or confusing the children, slowing down the teaching and learning process.

The number line board of our invention overcomes the problems of the prior known and used systems while incorporating the advantageous features of said systems. Specifically, a board is provided which has a number line permanently inscribed thereon and which board can be used as a blackboard. The numbers are removable from the board so that only those required for the problem are put on the board and can be changed readily in the simplest of manners. Extensible indicators or marking means are provided for blocking off or indicating two or more units or numbers as part of a problem. All of the features combine to provide an improved teaching aid for teaching mathematics and the like.

Referring specifically to the drawing wherein similar reference numerals refer to similar parts throughout the several views, a number line board 10 is shown as comprising a planar base member 12 having a decorative border 14 such as stainless steel, completely enclosing the outer periphery of the board. Juxtaposed with the base member 12 is a backing member 16 which is of magnetizable material such as soft iron or the like and which is also encased within the confines of the border 14. It is possible to have either the base member 12 or backing member 16 of a magnetizable material without departing from the invention, the only requirement being that the exposed surface area 17 of the number line board 10 be magnetizable.

The front surface 17 of the base member 12 has a coating or finish which is adapted to receive writing with chalk such as the slate surface used on blackboards. There are paints and other surface treatments available on the market which will permit writing thereon with chalk and which can be readily cleaned and rechalked without ill effects on the surface. The surface could also be finished with one of the new materials that permit the use of wax crayons or the like. These finishes are also such as to permit ready cleaning without deleterious effects on the surface.

Drawn straight across the middle of the front surface 17 of the board is a solid line 18 which is divided into equal increments by vertical short marks 20. The line 18 and marks 29 are hardened on the surface in such a way as to be substantially indestructible by the usual abrasion caused by cleaning the surface of the board.

A plurality of numerals 22 numbering generally from 0 to 9 and possibly in duplicates are provided. The numerals 22 may be made of magnetized plastic material or may be plastic with a small magnet 24 or magnetic material on the back of each one such that when the numeral is brought close to the surface 17 of the board the magnet will be attracted to the magnetizable material of the board to hold the number 22 in position on the board. In this way the numbers can be placed such as shown in FIGURE 1 as being from 0 to 12. It is sometimes desirable to put numbers starting from minus 9 to 0 to 9 or minus 3 to 0 to plus 6 or so on depending upon the lesson to be taught. Along with the numerals 22 is a plurality of minus and plus signs 26 and 28, respectively, which are magnetized the same as numerals 22 and are used to designate the appropriate condition on the numbers 22 when installed on the board.

In the kit shown in FIGURE 5 with the numerals 22, plus signs 28, and minus signs 26, is a plurality of discs 30 which are likewise magnetic and which are adapted to be positioned on the board in appropriate ways and for appropriate reasons which will be described hereinafter.

Each number line board 10 is provided with at least two indicator or marking tapes 32, each one of which is made up of a metal or the like flexible tape 34 which is spring coiled at one end portion on a reel, not shown, encased in a cover 36 which is mounted on a base 38 carrying a magnet 24 on its underside. The other end of the tape 34 is connected to a disc 40 which has a magnet 24 mounted in its underside also. The tapes 34 have unit marks on the outward facing surface, which marks correspond in length to the space between adjoining marks 20 on the number line 18 so that a tape 32 can be set to define the length of units desired, for instance, 3 units, 5 units, etc. The marking tapes 32 when retracted to a minimum length appear to be just two discs 38 and 40, but can be extended substantially the full length of the board.

The marking tapes 32 are used to indicate a blocked out or separated group of numbers. As an example, in FIGURE 1, the tape 32 is extended from 0 to 3 with the disc 38 lined up with the 0 and the disc 40 lined up with the 3, whereby the marking tape designates 3 units in a subsequent problem. The marking tapes are extended or retracted to the desired unit lengths and are positioned on the board by means of the magnetic attraction between the magnets in the discs 38 and 40 and the magnetizable material in the board.

The number line board 10 can be used to teach a beginning student how to count, how to recognize numbers, how to add, subtract, multiply and divide, how to recognize fractions, how to recognize sets (finite and infinite), subsets, null sets, opposites and reciprocals and so on, all by means of manipulating and using the basic tools set out hereinabove.

As an example, in FIGURE 1 the numerals 0 to 12 set on the board, one aligned with each line 20 of the number line 18.

To teach counting a disc 30 is placed one at a time in alignment with the appropriate number 0, 1, 2, etc. as the number is called out. The student can be given a magnetic disc 30 and told to place it in alignment with a selected number to show his or her comprehension of the lesson. The number can be put down in chalk in hand lettered form in alignment with the printed letter 22 as well as in spelled out form to teach that a printed letter 22 such as "4" is also "4" and is also "four." The system of using the letters 22, the chalk lettering and writing and the discs 30 has helped to teach number identification in a matter of hours that normally took days.

The discs 30 can also be used to teach simple addition by first setting out two discs 30 in one group and two more discs 30 in another group close by with a plus sign 28 in between the two. The student counts the discs and learns that 2 plus 2 is 4. The first group of two discs 30 is now put on the number board above the line 18 one in alignment with the number 1 and the other in alignment with the number 2. The second group of discs 30 is put on the number board below the line one in alignment with the 3 and the other with the 4. The sum of the discs 30 now becomes clear to the student.

To teach addition in a more advanced manner, the marking tapes 32 are used and, as shown, the addition of 3 plus 5 is to be effected. The top tape 32 is set at 3 units and is lined up on the board with the 0 and the 3. The other tape 32 is set at five units with the one disc 38 placed at the 3, the disc 40 will line up with the 8 to produce the result graphically of 3 plus 5 equals 8. With the tapes 32 magnetically set on the board 10, the addition becomes graphically very clear to the beginner.

FIGURE 3 illustrates a subtraction wherein the problem is to subtract 3 from 7. The one tape 32 is set at 7 and the other tape is set at 3. The top tape 32 (set at 7) is placed on the board in alignment with the 0 and the 7 while the bottom tape 32 (set at 3) is aligned with the 7 and back to the 4 on the number line. The student immediately sees that the difference between 7 and 3 is 4.

FIGURE 4 is in some ways preliminary to FIGURE 1 in that the view is used to demonstrate that numbers can be represented by lengths. That is, the top tape 32 is set to illustrate 5 units or its length is equivalent to 5. The bottom tape is set at 3 units of length to designate the number 3. By placing the two tapes 32 one at the end of the other as shown in FIGURE 1, the concept of addition is taught whereby 3 plus 5 is shown to be 8.

Since the surface is adapted to accept chalk marks, it is possible to teach groupings of numbers which are then used in other mathematics concepts. For instance, in FIGURE 4 the chalk lines 42 are used to group the numbers in two's. There are three groups of two's, which can be used to demonstrate the multiplication fact of 3×2 equals 6, i.e., three groups of two's equal six. The chalk marks can be readily erased without in any way interfering with the board, the line or the numbers.

In order to avoid confusing beginning students, only the numbers being used are put on the board, thereby eliminating the distraction occasioned by the presence of other numbers. The learning process progresses more rapidly this way, allowing the student to accept only that which is put before him and which grows (or builds) as the student's ability to comprehend the subject matter grows.

Only a few of the infinite number of concepts that can be taught by this device are illustrated but it is believed to be obvious to those trained in the art that other uses and concepts are within the scope of the invention taught herein and as are covered by the appended claim:

We claim:
In a teaching aid having a base member, a surface on said base member adapted to receive removable marks, a magnetizable material forming a backing for said base member, a permanent straight horizontal line formed on said surface of said base member, short vertical permanent lines crossing said horizontal line at equally spaced intervals along its length, a plurality of numbers selectively positioned on said board in alignment with some of said vertical lines, said numbers containing magnets for securing them to said surface of said board, an elongated flexi- ble tape having one end coiled on a reel, a magnet on said reel, and a disc with a magnet thereon at the other end of said tape, the tape being removably secured to the surface of said board and extending between two selected ones of said numbers.

References Cited

UNITED STATES PATENTS

| | | | |
|---|---|---|---|
| 1,165,058 | 12/1915 | Behan | 35—31.5 X |
| 1,735,883 | 11/1929 | Smith | 40—142 |
| 2,091,661 | 8/1937 | Forster et al. | 33—138 X |
| 2,599,320 | 6/1952 | Dart. | |
| 2,722,754 | 11/1955 | Slote | 35—31.6 |
| 3,224,126 | 12/1965 | Bogusz | 33—7.3 X |
| 3,276,151 | 10/1966 | Smith | 35—31.6 |

FOREIGN PATENTS 842,480   7/1960   Great Britain.

EUGENE R. CAPOZIO, *Primary Examiner.*

W. GRIEB, *Assistant Examiner.*